(12) United States Patent  
Akutsu et al.

(10) Patent No.: US 12,401,082 B2  
(45) Date of Patent: Aug. 26, 2025

(54) BATTERY MODULE

(71) Applicant: HONDA MOTOR CO., LTD., Tokyo (JP)

(72) Inventors: Shigemitsu Akutsu, Saitama (JP); Shinji Fujimoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 458 days.

(21) Appl. No.: 17/822,134

(22) Filed: Aug. 25, 2022

(65) Prior Publication Data

US 2023/0108683 A1   Apr. 6, 2023

(30) Foreign Application Priority Data

Oct. 1, 2021   (JP) ................. 2021-162924

(51) Int. Cl.  
*H01M 50/264* (2021.01)  
*H01M 50/211* (2021.01)

(52) U.S. Cl.  
CPC ....... *H01M 50/264* (2021.01); *H01M 50/211* (2021.01)

(58) Field of Classification Search  
CPC ............. H01M 10/647; H01M 50/209; H01M 50/211; H01M 50/262; H01M 50/264  
See application file for complete search history.

(56) References Cited

U.S. PATENT DOCUMENTS

| 9,425,440 | B2 * | 8/2016 | Kwon | H01M 50/105 |
| 2013/0052516 | A1 * | 2/2013 | Kim | H01M 50/209 |
| | | | | 429/159 |

| 2014/0106193 | A1 | 4/2014 | Kim et al. |
| 2015/0044536 | A1 | 2/2015 | Kwon et al. |
| 2018/0358643 | A1 | 12/2018 | Ko et al. |

FOREIGN PATENT DOCUMENTS

| JP | 2005069393 | A | | 3/2005 |
| JP | 2008293771 | A | | 12/2008 |
| JP | 2013045765 | A | | 3/2013 |
| JP | 2013222554 | A | | 10/2013 |
| JP | 2013235728 | A | | 11/2013 |
| JP | 2014531111 | A | | 11/2014 |
| JP | 2015106443 | A | * | 6/2015 |

(Continued)

OTHER PUBLICATIONS

Clarivate Analytics machine translation of JP 2008-293771 A (Year: 2008).*

(Continued)

*Primary Examiner* — Kevin E Yoon  
(74) *Attorney, Agent, or Firm* — CKC & Partners Co., LLC (57) ABSTRACT

To provide a battery module capable of suitably pressurizing a stack and having high energy density. Provided is a battery module including: a cell stack in which a plurality of battery cells are stacked, the battery cells including power generation elements and exterior bodies that cover the power generation elements, in which first through-holes penetrating through the plurality of battery cells in a stacking direction are provided at center portions of the plurality of battery cells, and a fastening member that fastens the cell stack is disposed in the first through-holes.

7 Claims, 7 Drawing Sheets

(56) References Cited

FOREIGN PATENT DOCUMENTS

| | | | | | |
|---|---|---|---|---|---|
| JP | 2017027673 | A | | 2/2017 | |
| JP | 2018081763 | A | | 5/2018 | |
| JP | 2018107078 | A | * | 7/2018 | |
| JP | 2018160334 | A | * | 10/2018 | |
| KR | 20130105272 | A | | 9/2013 | |
| KR | 20170072123 | A | | 6/2017 | |
| KR | 1020190110349 | A | * | 9/2019 | ........ H01M 10/0481 |
| KR | 1020210110046 | A | * | 9/2021 | |

OTHER PUBLICATIONS

Notification of Reasons for Refusal issued Dec. 3, 2024 in the JP Patent Application No. 2021-162924.
Office Action issued Feb. 5, 2025 in the U.S. Appl. No. 18/048,448.

* cited by examiner

BATTERY MODULE

This application is based on and claims the benefit of priority from Japanese Patent Application No. 2021-162924, filed on 1 Oct. 2021, the content of which is incorporated herein by reference.

BACKGROUND OF THE INVENTION

Field of the Invention

The present invention relates to a battery module.

Related Art

In order to cause a battery module that serves as a power source of an electric vehicle or the like to appropriately function, it is necessary to apply a pressure in a stacking direction to stacked battery cells and to pressurize the battery cells. In particular, it is necessary to apply a much higher pressure to a solid secondary battery using a solid electrolyte as an electrolyte than to a liquid secondary battery using a liquid electrolyte. As a pressurization method, there is a method of bonding end plates and side plates to end surfaces and side surfaces of a stack of battery cells on both sides in a state in which the stack is initially pressurized from the end surfaces of the stack on both sides.

According to the aforementioned pressurization method, it is necessary to apply a higher initial pressure than a target pressure to the stack. Also, since an elastic modulus in the stacking direction of the stack varies, there is a problem that a residual load is not uniform. Moreover, as a result of a necessity of strength and rigidity of the end plates and the side plates, there is also a problem that a space for the members increases and occupancy of the battery cells in the battery module decreases. As a pressurization method other than the above method, a technique of sandwiching a stack with a pair of pressurizing plates and pressurizing the pair of pressurizing plates with a connecting rod has been disclosed (see Patent Document 1, for example).

Patent Document 1: Japanese Unexamined Patent Application, Publication No. 2008-293771

SUMMARY OF THE INVENTION

The technique disclosed in Patent Document 1 is adapted such that a plurality of square lithium ion batteries are disposed on the same plane and a pair of pressurizing plates are coupled by a central portion coupling rod and a peripheral portion coupling rod. According to the above technique, a space for disposing the central portion coupling rod is formed at the center by disposition of the plurality of battery cells, a space for disposing the peripheral portion coupling rod is also needed, and there is thus a problem that the volume occupied by the members other than the battery cells in a battery module increases and energy density of the battery cells decreases.

The present invention was made in view of the above circumstances, and an object thereof is to provide a battery module capable of suitably pressurizing a stack and having high energy density.

(1) The present invention relates to a battery module including: a cell stack in which a plurality of battery cells are stacked, the battery cells including power generation elements and exterior bodies that cover the power generation elements, in which first through-holes penetrating through the plurality of battery cells in a stacking direction are provided at center portions of the plurality of battery cells, and a fastening member that fastens the cell stack is disposed in the first through-holes.

According to the invention in (1), it is possible to provide a battery module capable of suitably pressurizing the stack and having high energy density.

(2) The battery module according to (1), in which the exterior bodies are lamination films.

According to the invention in (2), it is possible to improve energy density of the battery module as compared with a case in which the exterior bodies are constituted by metal.

(3) The battery module according to (1) or (2), in which a center securing member provided with a second through-hole is disposed between the plurality of battery cells and at the center of the battery module in the stacking direction, the center securing member is disposed such that the second through-hole communicates with the first through-holes, and the fastening member is inserted into and secured to the second through-hole.

(3) According to the invention in (3), it is possible to uniformly pressurize the stack. Also, since the center securing member receives only a compression load, it is possible to constitute the center securing member using light-weight metal or the like.

(4) The battery module according to (3), in which the center securing member includes a coupling portion for coupling to a case that accommodates the cell stack.

According to the invention in (4), it is possible to further enhance rigidity of the cell stack.

(5) The battery module according to any of (1) to (4), further including: end plates that are disposed at both ends of the cell stack in the stacking direction; fastening nuts that fasten the fastening member and the end plates outside the cell stack; and rotation stopper portions that are disposed in the vicinity of the fastening nuts.

According to the invention in (5), a torsional stress at the fastening portion is generated in a limited manner in the above vicinity sections, and a most section of the fastening member is thus in a state with no residual torsional stress. As a result, it is possible to apply a higher pressure to the cell stack and to reduce an elastic modulus of the member to an arbitrary value.

(6) The battery module according to any of (1) to (5), further including: end plates that are disposed at both ends of the cell stack in the stacking direction; fastening nuts that fasten the fastening member and the end plates outside the cell stack; stays that are fastened with the fastening nuts; and a case that accommodates the cell stack, in which the cell stack is secured to the case with the stays.

According to the invention in (6), the stays can absorb displacement that accompanies expansion and contraction of the cell stack.

(7) The battery module according to (6), in which rigidity of the stays in the stacking direction is lower than rigidity of the stays in a direction that is orthogonal to the stacking direction.

According to the invention in (7), the stays can more suitably absorb the displacement that accompanies expansion and contraction of the cell stack.

(8) The battery module according to (6) or (7), in which the stays have first inclined portions that are inclined in a direction spreading downward in a view from the stacking direction.

According to the invention in (8), the stays can more suitably absorb the displacement that accompanies expansion and contraction of the cell stack.

(9) The battery module according to any of (6) to (8), in which the stays have second inclined portions that are inclined downward from fastening portions for fastening with the fastening nuts toward an outer side of the cell stack in the stacking direction.

According to the invention in (9), the stays can more suitably absorb the displacement that accompanies expansion and contraction of the cell stack.

DETAILED DESCRIPTION OF THE INVENTION

First Embodiment

A battery module according to a first embodiment of the present invention will be described with reference to FIGS. 1 to 3. In each drawing described below, the same reference signs are applied to the same components and corresponding components.

[Cell Stack]

Figure 1:
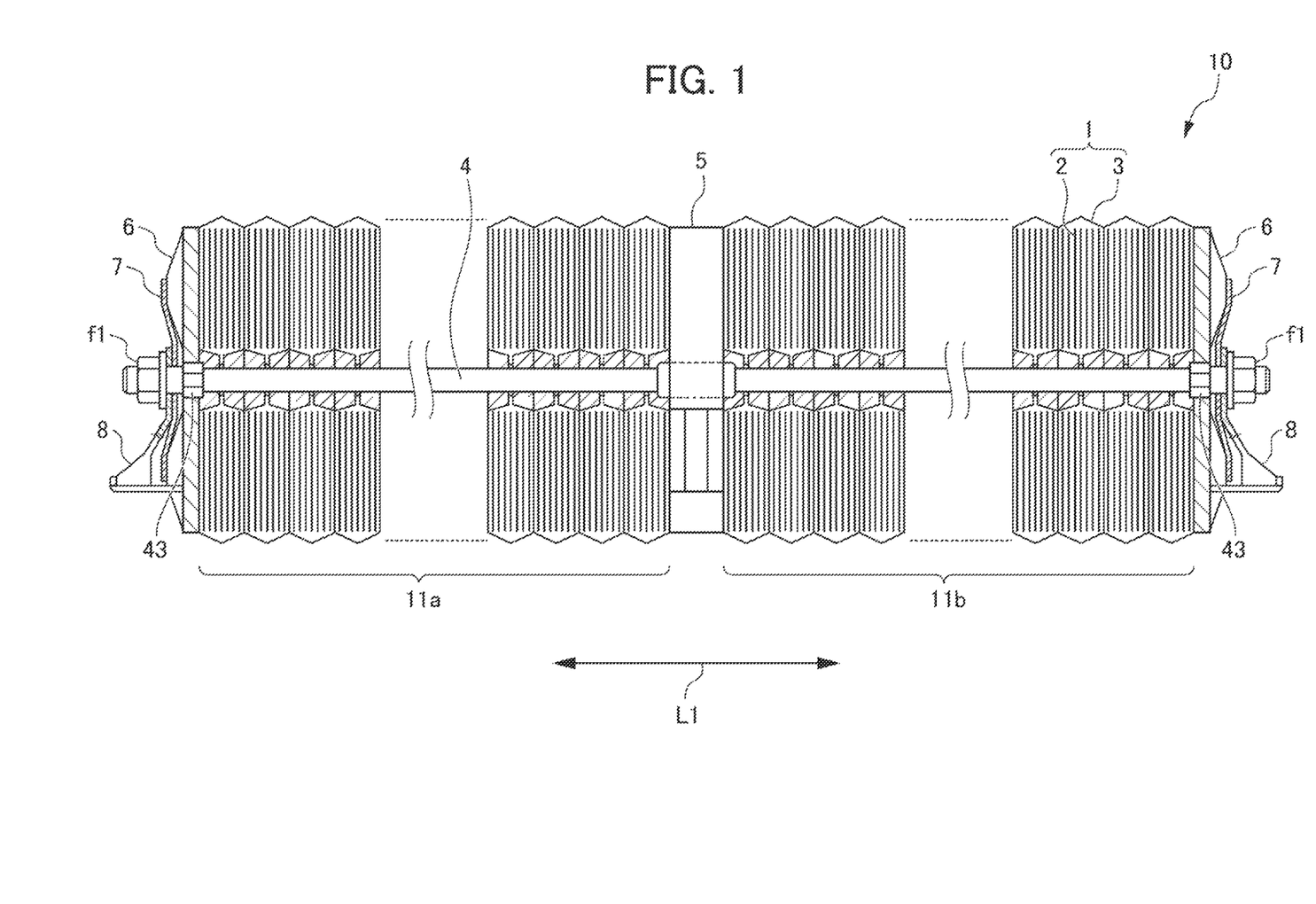
FIG. 1 is a partial sectional view illustrating a battery module according to a first embodiment of the present invention in a side view.

A battery module 10 according to the first embodiment includes cell stacks 11a and 11b in which a plurality of battery cells 1 including power generation elements 2 and exterior bodies 3 that cover the power generation elements 2 are stacked as illustrated in FIG. 1. The power generation elements 2 are solid batteries in which positive electrode layers, solid electrolyte layers, and negative electrode layers are repeatedly stacked in this order, for example. Although the following description will be given on the assumption that the power generation elements 2 are solid batteries, the power generation elements 2 may be electrolyte solution-based batteries including liquid electrolytes. The battery module 10 includes, in addition to the above components, a fastening member 4, a center securing member 5, end plates 6, pressurizing plates 7, stays 8, and fastening nuts f1.

As a material constituting the positive electrode layers, the solid electrolyte layers, and the negative electrode layers in the power generation elements 2, it is possible to use a material known as a material constituting a solid battery.

The exterior bodies 3 accommodate the power generation elements 2 therein. Although the exterior bodies 3 are not particularly limited, the exterior bodies 3 are preferably lamination films. It is possible to reduce the volume of the exterior bodies by constituting the exterior bodies as lamination films and thereby to improve energy density of the battery module. The lamination films have multilayer structures in which thermally fusion-bonding resin layers such as polyolefin are stacked on the outer side of metal layers made of aluminum, stainless steel (SUS), or the like, for example. It is also possible to use metal cans as the exterior bodies 3.

The plurality of battery cells 1 are stacked in the same direction (the stacking direction L1 illustrated in FIG. 1) as the stacking direction of the electrode layers constituting the power generation elements 2 and thereby constitute the cell stacks 11a and 11b. The cell stacks 11a and 11b are sandwiched with a pressure and held by the end plates 6 from both end sides in the stacking direction L1.

Figure 2:
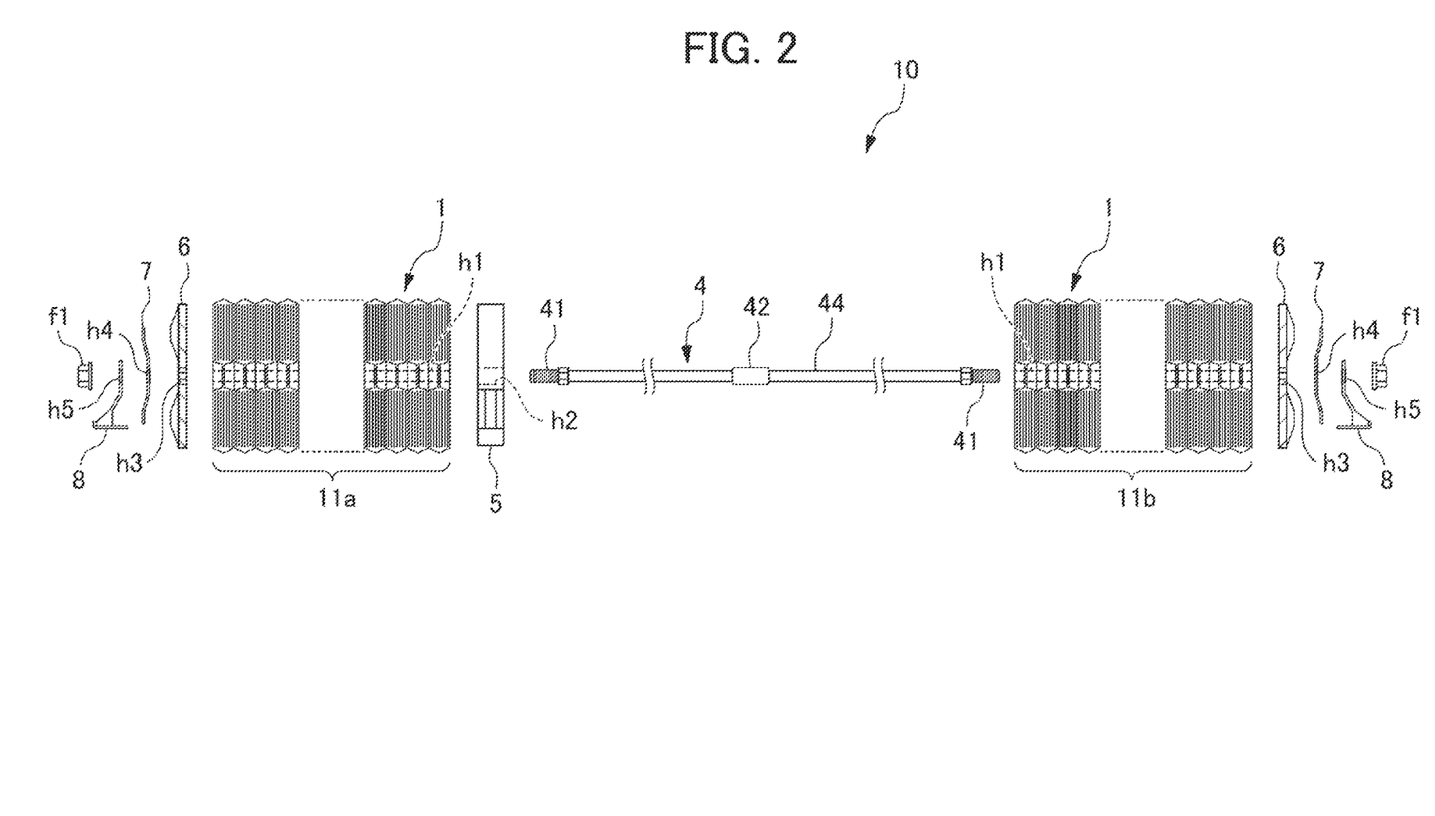
FIG. 2 is an exploded view illustrating a structure of the battery module in FIG. 1.

Each of the plurality of battery cells 1 is provided with a first through-hole h1 (which may be simply referred to as a "through-hole h1" below) in a direction in which it penetrates through each electrode layer constituting the power generation elements 2, at the center portion in a section in the up-down direction along the stacking direction L1, as illustrated in FIG. 2. The through-holes h1 are hole portions that penetrate through the battery cells 1 including the exterior bodies 3. Although the shape of the through-holes h1 is not particularly limited, the through-holes h1 preferably have a circular sectional shape that is similar to the sectional shape of the fastening member 4, which will be described later. As a method for forming the through-holes h1, it is possible to form the through-holes h1 by forming stacks with through-holes opened in each electrode layer and each solid electrolyte layer constituting the power generation elements 2, sealing the stacks in the exterior bodies 3, bonding the exterior bodies 3 at locations corresponding to the through-holes through welding of the laminate films, and forming through-holes that are slightly smaller than the above through-holes on the inner circumferential side of above the through-holes through punching, for example.

The plurality of battery cells 1 are disposed such that each through-hole h1 communicates with each other, and the fastening member 4 that fastens the cell stacks 11a and 11b is disposed in the through-holes h1. A pair of end plates 6 are fastened with the fastening member 4 in a direction in which the interval therebetween is narrowed. It is thus possible to pressurize the cell stacks 11a and 11b without performing initial pressurization (pre-pressurization) thereon.

[Fastening Member]

The fastening member 4 includes a shaft portion that serves as a main body; male screw portions 41 formed at both ends of the shaft portion, a diameter expansion portion 42 formed at the center portion in the axial direction, and rotation stopper portions 43 that are disposed between the male screw portions 41 and the shaft portion. The diameter expansion portion 42 is disposed in a second through-hole h2 in the center securing member 5, which will be described later. The fastening member 4 is screwed into the fastening nuts f1 with the shaft portion thereof inserted into the through-holes h1 of the cell stacks 11a and 11b and with the male screw portions 41 extending from hole portions h3, h4, and h5 provided in the end plates 6, the pressurizing plates 7, and the stays 8, respectively, at both end portions of the cell stacks 11a and 11b. The sectional shape of the fastening member 4 is preferably a circular shape from a viewpoint of obtaining a uniform sectional stress.

It is possible to uniformize a surface pressure to be applied to the cell stacks 11a and 11b by causing the fastening member 4 to be inserted into the through-holes h1 provided at the center portions in the stack surfaces of the cell stacks 11a and 11b and pressurizing the cell stacks 11a and 11b using a pair of end plates 6 and fastening nuts f1. Also, since it is not necessary to provide an outer frame for securing the cell stacks, and it is possible to improve a volume ratio of the power generation elements 2 in the battery module 10, it is possible to improve energy density of the battery module 10.

The rotation stopper portions 43 are disposed inside hole portions h3 formed in the end plates 6 in the vicinity of the fastening nuts f1 as illustrated in FIG. 1. The rotation stopper portions 43 are members having a polygonal shape or a saw-tooth shape in a sectional view in the axial direction, for example. The rotation stopper portions 43 may be formed integrally with the fastening member 4 or may be configured as members that are separated from the fastening member 4 and may be firmly fixed to the fastening member 4.

The rotation stopper portions 43 have a function of receiving a torsional stress in the axial direction of the fastening member 4 by being fitted into the hole portions h3 formed in the end plates 6 and having an inner surface shape corresponding to the sectional shape of the rotation stopper portions 43, for example. In this manner, the torsional stress generated when the male screw portions 41 are screwed into the fastening nuts f1 is transmitted only to the male screw portions 41 of the fastening member 4 and the rotation stopper portions 43 and is not transmitted from the rotation stopper portions 43 of the inner side of the cell stacks 11a and 11b. It is thus possible to prevent loosening of the fastening nuts f1 during use of the battery module 10 over a long period of time. Additionally, it is possible to apply a larger axial force to the fastening member 4 through fastening of the fastening nuts f1. In addition to the above effect, it is possible to finely adjust the surface pressure to be applied to the cell stacks 11a and 11b depending on a degree of fastening of the fastening nuts f1.

The diameter of the shaft portion 44 of the fastening member 4 illustrated in FIG. 2 in the section in the axial direction can be designed in accordance with the surface pressure to be applied to the cell stacks 11a and 11b. Since a stress per unit area to be applied to the shaft portion 44 increases by reducing the diameter, it is possible to reduce an elastic modulus with which the end plates 6 are held in a direction of compressing the distance therebetween and to reduce a width of a change in surface pressure to be applied to the cell stacks 11a and 11b.

[Center Securing Member]

The center securing member 5 is a member disposed between the plurality of battery cells 1 and is a member disposed at the center of the battery module 10 in the stacking direction L1 as illustrated in FIG. 1. The surface pressure to be applied to the cell stacks 11a and 11b is uniformized in the stacking direction L1 by the center securing member 5. The center securing member 5 receives only a compressing force in the stacking direction L1 and can thus be constituted by light-weight metal such as aluminum, for example.

The center securing member 5 is provided with a second through-hole h2 (which may be simply referred to as a "through-hole h2" below) in which the diameter expansion portion 42 of the fastening member 4 is disposed. As illustrated in FIG. 2, the center securing member 5 is disposed such that the through-hole h2 communicates with the through-holes h1. The through-hole h2 may be able to be secured to the diameter expansion portion 42 in a surface that is vertical to the axial direction through spigot joint or the like. It is thus possible to position and secure the center securing member 5 and the fastening member 4 and to easily dispose the center securing member 5 at the center of the battery module 10 in the stacking direction L1.

[End Plate]

The end plates 6 are a pair of members disposed at both ends of the cell stacks 11a and 11b in the stacking direction L1. The hole portions h3 into which the fastening member 4 can be inserted are formed in the end plates 6 as illustrated in FIG. 2. The end plates 6 sandwich the cell stacks 11a and 11b with a pressure and hold them by the fastening member 4 being inserted into the hole portions h3 and fastened with the fastening nuts f1.

Figure 3:
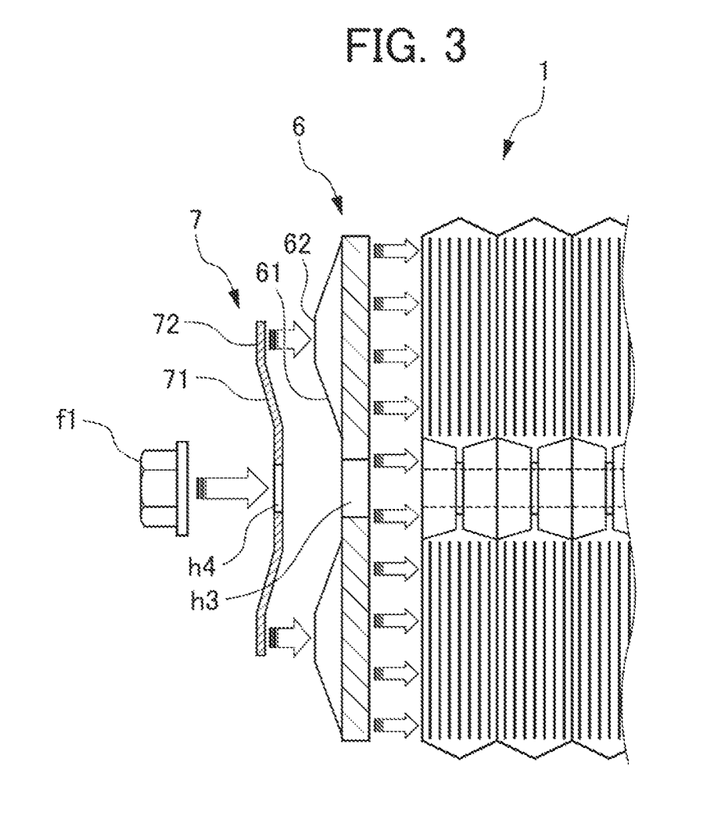
FIG. 3 is a diagram illustrating main components in FIG. 2 in an enlarged manner.

The end plates 6 include inclined portions 61 and load points 62 as illustrated in FIG. 3. The load points 62 are surfaces that are continuous with the inclined portions 61 and are surfaces that are substantially vertical to the stacking direction L1. The end plates 6 are in contact with the pressurizing plates 7 at the plurality of load points 62. In this manner, the surface pressure to be applied from the end plates 6 to the cell stacks 11a and 11b is uniformized with respect to the stacked surfaces.

[Pressurizing Plate]

The pressurizing plates 7 are a pair of members fastened along with the end plates 6 with the fastening nuts f1. The pressurizing plates 7 are disposed outside both ends of the cell stacks 11a and 11b in the stacking direction L1 in the stacking direction L1 of the end plates 6. The pressurizing plates 7 are elastically deformable members and are members with a plate spring shape made of metal, for example. Hole portions h4 into which the fastening member 4 can be inserted are formed in the pressurizing plates 7 as illustrated in FIG. 2. The axial force generated by fastening of the fastening nuts f1 is transmitted to the end plates 6 via the pressurizing plates 7 by the fastening member 4 being inserted into the hole portions h1 and fastened with the fastening nuts f1.

The pressurizing plates 7 include inclined portions 71 and load points 72 as illustrated in FIG. 3. The inclined portions 71 are surfaces inclined along the inclined portions 61. The load points 72 are surfaces that are continuous with the inclined portions 71 and are surfaces that are substantially vertical to the stacking direction L1.

[Stay]

The stays 8 are a pair of members that are fastened along with the end plates 6 and the pressurizing plates 7 with the fastening nuts f1. The stays 8 are members for securing the cell stacks 11a and 11b. The stays 8 are disposed outside both ends of the cell stacks 11a and 11b in the stacking direction L1 outside the pressurizing plates 7 in the stacking direction L1. Hole portions h5 into which the fastening members 4 can be inserted into the stays 8 as illustrated in FIG. 2. The fastening member 4 is inserted into the hole portions h5 and is fastened with the fastening nuts f1. It is possible to reduce installation spaces for the stays 8 and the number of components by using the fastening member 4 to secure the stays 8. Details of a configuration of the stays 8 will be described below in a second embodiment.

Second Embodiment

Figure 8:
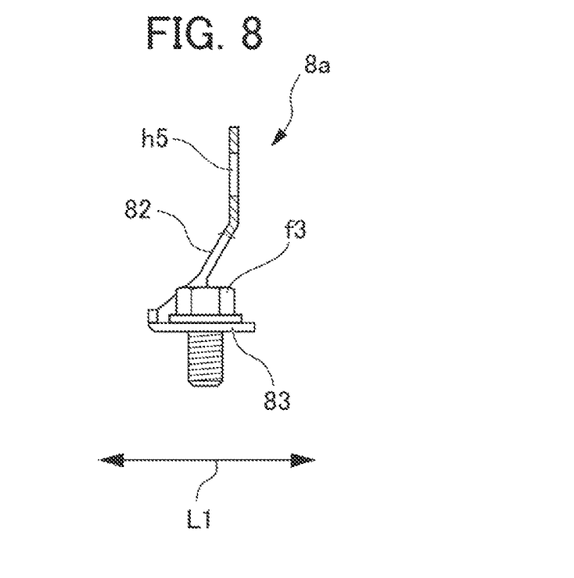
FIG. 8 is a diagram of main components of the battery module in FIG. 7 in a view from a side surface.

Next, the second embodiment of the present invention will be described with reference to FIGS. 4 and 8. The same reference signs may be applied to configurations that are similar to those in the above first embodiment in the drawings, and the description thereof may be omitted.

Figure 4:
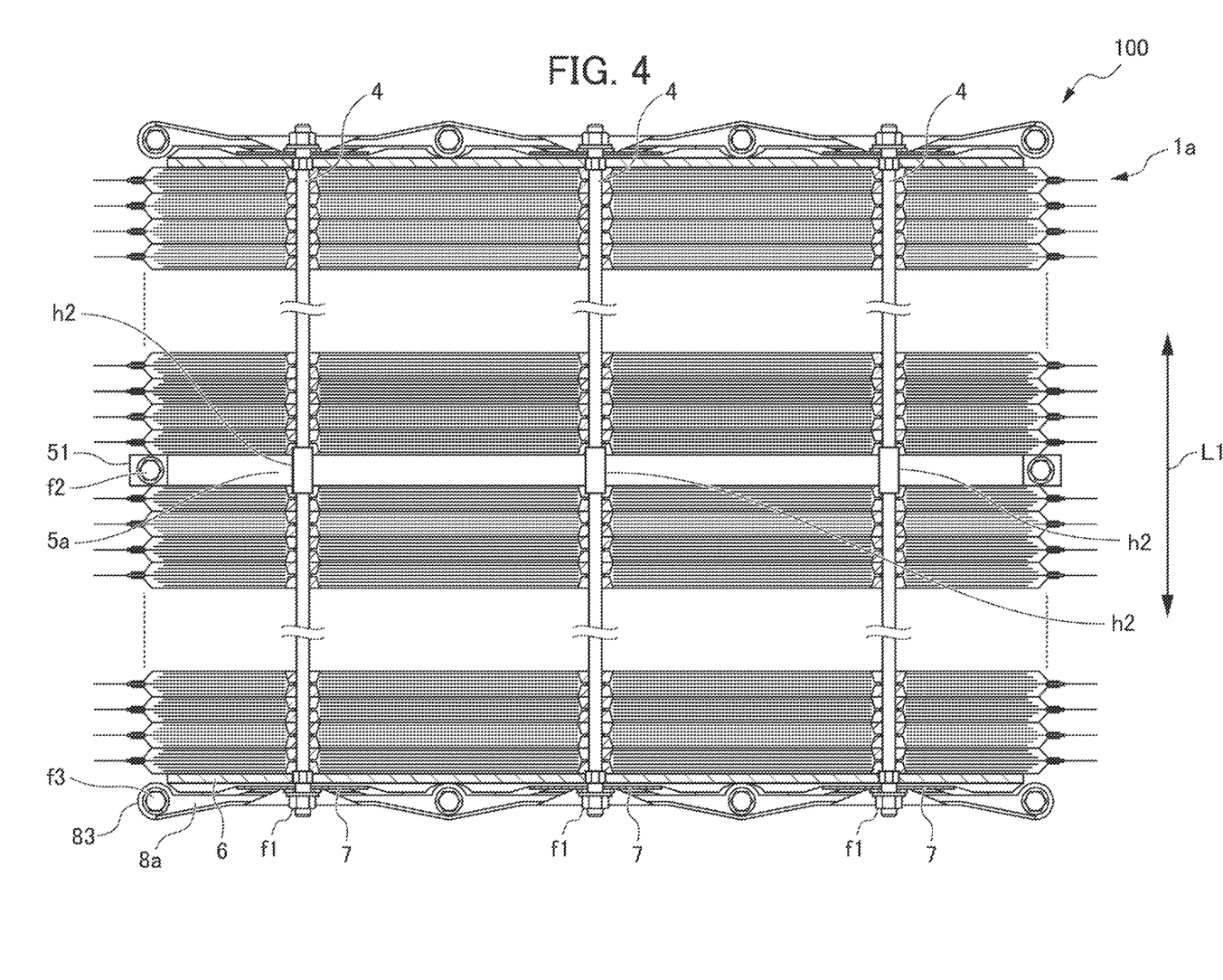
FIG. 4 is a partial sectional view illustrating a battery module according to a second embodiment of the present invention in a top view.
Figure 5:
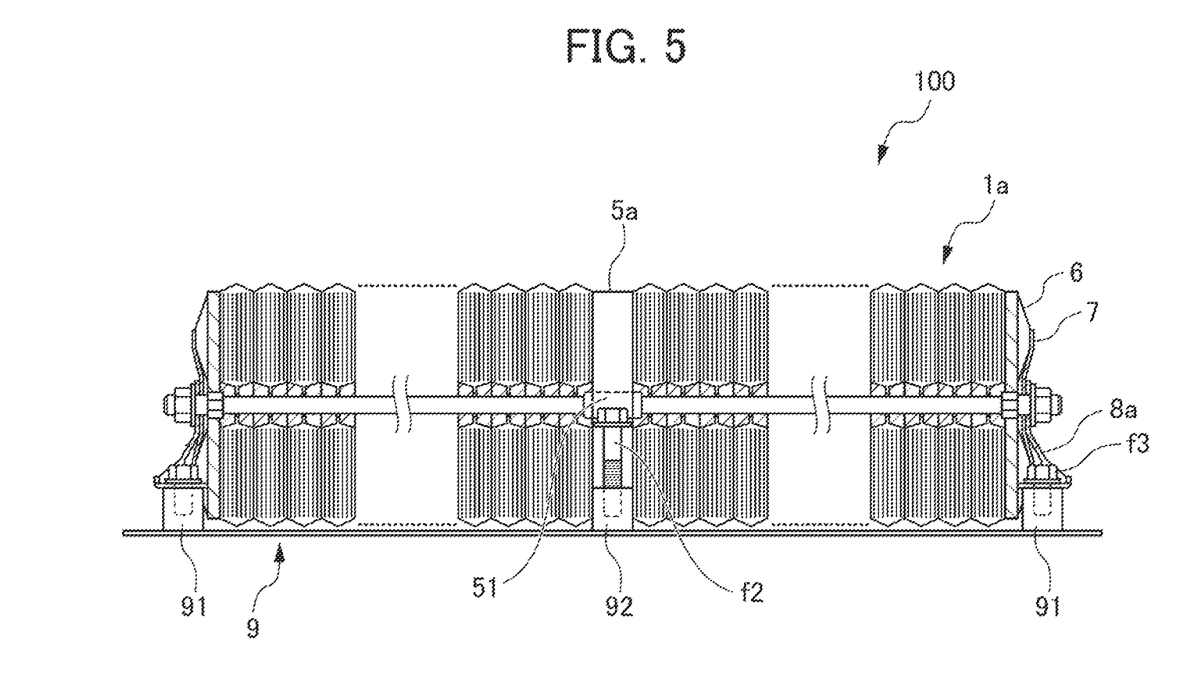
FIG. 5 is a partial sectional view illustrating the battery module in FIG. 4 in a side view.

FIG. 4 is a top view of a battery module 100 according to the second embodiment. The battery module 100 is a larger battery module obtained by combining the battery modules 10. As illustrated in FIGS. 4 and 5, a plurality of hole portions are formed at center portions of sections of a plurality of battery cells 1a in the up-down direction along the stacking direction L1, and a plurality of fastening members 4 (three in the present embodiment) are inserted into and disposed in the hole portions. The number of disposed fastening members 4 is not limited to the above number and may be two or four, for example. The battery module 100 includes a case 9 that accommodates the stacks of the battery cells 1a as illustrated in FIGS. 5 and 6.

A center securing member 5a according to the present embodiment includes a plurality of through-holes h2 into which the fastening members 4 are inserted. Also, the center securing member Sa includes a coupling portion 51 for coupling to the case 9. The center securing member 5a and the case 9 are coupled to the coupling portion 51 with a fastening bolt f2 screwed thereinto. It is thus possible to further enhance rigidity of the stacks of the battery cells 1a.

Figure 6:
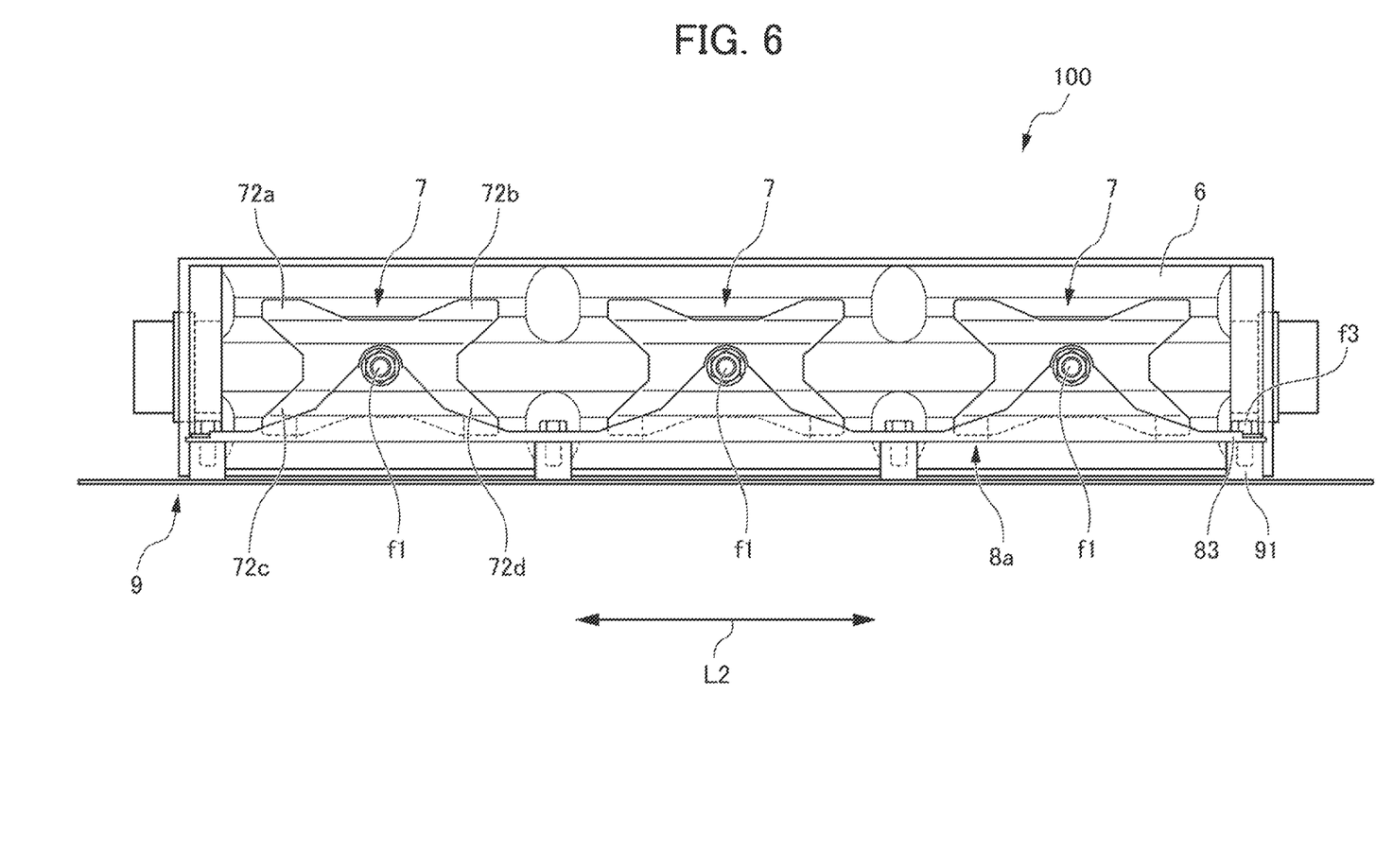
FIG. 6 is a diagram of the battery module in FIG. 4 in a view from one stacking direction side.

Three pressurizing plates 7 according to the present embodiment are disposed in a direction L2 that is a direction orthogonal to the stacking direction L1 as illustrated in FIG. 6. Also, four load points 72a, 72b, 72c, and 72d where the pressurizing plates 7 come into contact with the end plates 6 are disposed at positions that are symmetric with respect to the fastening nuts f1 in the present embodiment.

[Stay]

Figure 7:
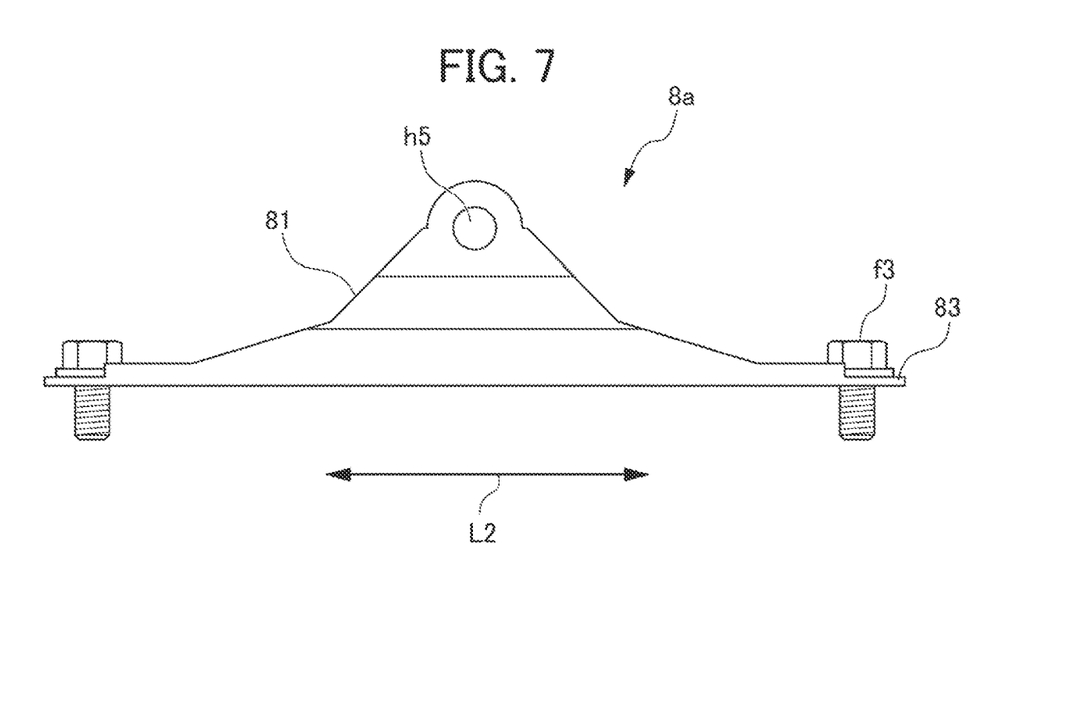
FIG. 7 is a diagram of the battery module in FIG. 4 in a view from the one stacking direction side.

Stays 8a according to the present embodiment includes coupling portions 83 for coupling to the case 9 between both ends of the direction L2 that is orthogonal to the stacking direction L1 and/or fastening members 4 as illustrated in FIGS. 6 and 7. The stays 8a and the case 9 are coupled by the fastening bolts f3 being screwed into the coupling portions 83. It is thus possible to further enhance rigidity of the stacks of the battery cells 1a. Also, the stays 8a are constituted by elastically deformable members and have rigidity in the stacking direction set to be lower than rigidity in the direction that is orthogonal to the stacking direction L1. The stays 8a can thus absorb displacement of the battery cells 1a that accompanies expansion and contraction of the stacks.

FIG. 7 is a view of a part of the stay 8a disposed on a side of a stacking end of the battery module 100 seen from the same point of view as that in FIG. 6 in the stacking direction L1. The stay 8a includes a first inclined portion 81 inclined in a direction spreading downward in a view from the stacking direction L1 as illustrated in FIG. 7. Also, the stay 8a includes a second inclined portion 82 inclined downward from a hole portion h5 that is a fastening portion for fastening with the fastening nut f1 toward the outer side in the stacking direction L1 as illustrated in FIG. 8. With the above configuration, the stay Ba can absorb displacement of the battery cells 1a that accompanies expansion and contraction of the stacks through deflection deformation in the stacking direction L1. On the other hand, the rigidity with respect to the stacking surfaces of the battery cells 1a is high, and it is possible to suitably secure the stacks of the battery cells 1a.

Although the preferred embodiments of the present invention have been described hitherto, the present invention is not limited to the above embodiment and can be appropriately modified.

The above embodiments have been described on the assumption that the rotation stopper portions 43 are fitted into the hole portions h3 formed in the end plates 6, for example, and having an inner surface shape corresponding to the sectional shape of the rotation stopper portions 43. The present invention is not limited thereto. The rotation stopper portions 43 may be provided at end portions of the male screw portions 41 to secure the end portions of the male screw portions 41.

The above embodiments have been described on the assumption that the hole portions h5 into which the fastening member 4 can be inserted are formed and the stays 8 and 8a are fastened with the fastening nuts f1. The present invention is not limited thereto. The stays in the present invention may be coupled to the pressurizing plates at one location or a plurality of locations.

EXPLANATION OF REFERENCE NUMERALS 10, 100 Battery module
1, 1a Battery cell
11a, 11b Cell stack
2 Power generation element
3 Exterior body
4 Fastening member
43 Rotation stopper portion
5, 5a Center securing member
51 Coupling portion
6 End plate
8 Stay
81 First inclined portion
82 Second inclined portion
9 Case
f1 Fastening nut
h1 First through-hole
h2 Second through-hole
L1 Stacking direction

What is claimed is:

1. A battery module comprising:
a cell stack in which a plurality of battery cells are stacked, the battery cells including power generation elements and exterior bodies that cover the power generation elements;
end plates that are disposed at both ends of the cell stack in a stacking direction;
fastening nuts that fasten a fastening member and the end plates outside the cell stack;
stays that are fastened with the fastening nuts; and
a case that accommodates the cell stack,
wherein first through-holes penetrating through the plurality of battery cells in the stacking direction are provided at center portions of the plurality of battery cells,
the fastening member that fastens the cell stack is disposed in the first through-holes,
the cell stack is secured to the case with the stays, and
the stays have first inclined portions that are inclined in a direction spreading toward a coupling portion for coupling to the case in a view from the stacking direction.

2. The battery module according to claim 1, wherein the exterior bodies are lamination films.

3. The battery module according to claim 1,
wherein a center securing member provided with a second through-hole is disposed between the plurality of battery cells and at a center of the battery module in the stacking direction,
the center securing member is disposed such that the second through-hole communicates with the first through-holes, and
the fastening member is inserted into and secured to the second through-hole.

4. The battery module according to claim 3, wherein the center securing member includes a coupling portion for coupling to the case that accommodates the cell stack.

5. The battery module according to claim 1, further comprising:

rotation stopper portions that are disposed in a vicinity of the fastening nuts.

6. The battery module according to claim 1, wherein rigidity of the stays in the stacking direction is lower than rigidity of the stays in a direction that is orthogonal to the stacking direction.

7. The battery module according to claim 1, wherein the stays have second inclined portions that are inclined toward the coupling portion for coupling to the case from fastening portions for fastening with the fastening nuts toward an outer side of the cell stack in the stacking direction.

* * * * *